United States Patent [19]

Morimoto et al.

[11] Patent Number: 4,858,078

[45] Date of Patent: Aug. 15, 1989

[54] SOLID ELECTROLYTIC CAPACITOR

[75] Inventors: Takeshi Morimoto; Eiji Endoh; Satoshi Takemiya, all of Yokohama, Japan

[73] Assignees: Asahi Glass Company Ltd., Tokyo; Elna Company Ltd., Fujisawa, both of Japan

[21] Appl. No.: 264,036

[22] Filed: Oct. 28, 1988

[30] Foreign Application Priority Data

Oct. 30, 1987 [JP] Japan .................. 62-273428

[51] Int. Cl.$^4$ .................. H01G 9/05; H01B 1/00
[52] U.S. Cl. .................. 361/527; 252/500
[58] Field of Search .................. 252/500; 29/570.1; 361/507, 509, 511, 516, 523, 524, 525, 527, 528, 533, 534

[56] References Cited

U.S. PATENT DOCUMENTS

| | | |
|---|---|---|
| 3,679,944 | 7/1972 | Yoshimura et al. ........... 29/570.1 X |
| 4,617,143 | 10/1986 | Kossmehl et al. .................. 252/500 |
| 4,762,644 | 8/1988 | Kobayashi et al. .................. 252/500 |

FOREIGN PATENT DOCUMENTS

| | | |
|---|---|---|
| 189714 | 8/1987 | Japan .................. 29/570.1 |
| 63-102309 | 5/1988 | Japan . |

Primary Examiner—Donald A. Griffin
Attorney, Agent, or Firm—Oblon, Spivak, McClelland, Maier & Neustadt

[57] ABSTRACT

A solid electrolytic capacitor comprising a dielectric oxide layer and a solid electrolyte layer of a conductive polymer compound formed thereon, wherein said conductive polymer compound is a conductive polymer compound doped with at least one member selected from the group consisting of phosphoric acid, phosphoric acid monoesters, phosphoric acid diesters and salts thereof.

9 Claims, No Drawings

SOLID ELECTROLYTIC CAPACITOR

BACKGROUND OF THE INVENTION

1. Field of the Invention

The present invention relates to a solid electrolytic capacitor. Particularly, it relates to a solid electrolytic capacitor wherein a conductive polymer compound is used as the solid electrolyte.

2. Discussion of Background

In recent years, electronic equipments and devices tend to be small in size and light in weight. Accordingly, small size capacitors having a large capacity and a low impedance at a high frequency region have been desired. As capacitors for such high frequency use, mica capacitors, film capacitors or ceramic capacitors have been used. However, none of these capacitors are suitable for a large capacity.

On the other hand, as small size capacitors having a large capacity, there are aluminum electrolytic capacitors or tantalum capacitors.

The aluminum electrolytic capacitors have a merit that products having a large capacity can be obtained at low costs. However, since they employ an electrolyte, they have drawbacks that the capacity deteriorates due to the evaporation of the electrolyte as time passes, and they are inferior in the high frequency characteristics.

On the other hand, tantalum solid electrolytic capacitors overcome such drawbacks of the aluminum electrolytic capacitors such as the deterioration of the capacity, by using e.g. solid manganese dioxide as the electrolyte. However, this solid electrolyte is prepared by impregnating and depositing an aqueous manganese nitrate solution to a valve metal, followed by thermal decomposition of manganese nitrate at a temperature of about 350° C. In order to increase the amount of the deposition of manganese dioxide, it is necessary to repeat the steps of impregnation and thermal decomposition from a few times to a few tens times. Consequently, there have been drawbacks such that the dielectric oxide layer is likely to be damaged during the thermal decomposition, and the mending capability of the manganese dioxide layer is low.

In order to overcome such drawbacks, it has been proposed e.g. in Japanese Unexamined Patent Publication No. 17609/1983 to employ a 7,7,8,8-tetracyanoquinodimethane complex salt (hereinafter referred to simply as the TCNQ complex salt) as an organic solid electrolyte having good conductivity and excellent properties for mending the dielectric oxide layer. This Japanese Unexamined Patent Publication No. 17609/1983 discloses a capacitor wherein an organic semiconductor comprising the TCNQ complex salt between TCNQ and an isoquinolinium cation having the N-position substituted by an alkyl group, is used as the solid electrolyte, and the solid electrolyte layer is formed by dipping a capacitor element in the molten TCNQ salt followed by cooling and solidifying TCNQ the salt prior to the decomposition of the salt.

Further, it has been proposed to employ a polymer complex between polyvinyl alcohol and a 5-membered heterocyclic compound such as polypyrrole or polythiophene, as a solid electrolyte (see Japanese Unexamined Patent Publication No. 102309/1988.)

However, solid electrolytic capacitors using such TCNQ complex salt have a drawback that during the cooling and solidification after the dipping, the TCNQ complex salt crystallizes and does not adequately adhere to the dielectric oxide layer, whereby it is hardly possible to obtain the initial electrostatic capacity.

Further, the TCNQ complex salt has poor heat stability. Accordingly, when kept in a molten state at a high temperature, it undergoes thermal decomposition and changes into an electrical insulator in a short period of time, followed by quick cooling treatment, and a rather complicated apparatus for such operation will be required. Thus, there is a problem that the production cost is high.

Further, capacitors using the TCNQ complex salt have poor heat resistance against soldering (hereinafter referred to as the soldering heat resistance). Namely, by a heat shock at b 260° C. for 10 seconds, the leakage current increases substantially, whereby it is extremely difficult to prepare chip type capacitors of such capacitors.

Likewise, capacitors employing a polymer complex comprising a 5-membered heterocyclic compound polymer and polyvinyl alcohol, have also poor soldering heat resistance, whereby the leakage current increases at a high temperature, and it is extremely difficult to prepare chips of such capacitors.

SUMMARY OF THE INVENTION

It is an object of the present invention to solve the above-mentioned problems and to provide a solid electrolytic capacitor which can be produced at a low production cost as compared with conventional solid electrolytic capacitors and whereby a desired electrostatic capacity can surely be obtained, the dielectric oxide layer is free from defects, and the leakage current is small.

The present invention provides a solid electrolytic capacitor comprising a dielectric oxide layer and a solid electrolyte layer of a conductive polymer compound formed thereon, wherein said conductive polymer compound is a conductive polymer compound doped with at least one member selected from the group consisting of phosphoric acid, phosphoric acid monoesters, phosphoric acid diesters and salts thereof.

DETAILED DESCRIPTION OF THE PREFERRED EMBODIMENTS

In the present invention, the conductive polymer compound is preferably a polymer having repeating units represented by the following formula A:

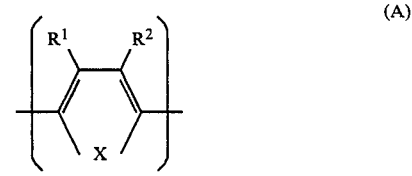

wherein each of $R^1$ and $R^2$ is hydrogen, halogen, an alkyl group, an aryl group, an alkylaryl group, or $R^1$ and $R^2$ together form a ring structure, and X is —O—, —S—,

(wherein $R^3$ is hydrogen an alkyl group, an aryl group or an alkylaryl group).

Specifically, an aromatic heterocyclic compound such as polypyrrole, an N-substituted polypyrrole, a β-substituted polypyrrole, polythiophene, a β-substituted polythiophene, polyfuran or a β-substituted polyfuran, may be mentioned.

The structure of the conductive polymer may be represented by the following formula:

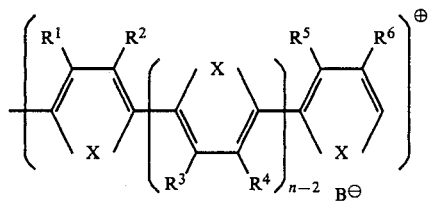

wherein each of $R^1$ to $R^6$ is hydrogen, halogen, an alkyl group, an aryl group or an alkylaryl group, $B^\ominus$ is an anion, X is as defined above with respect to the formula A, and n is an integer of at least 3. The electrochemical equivalent of an anion is bonded per from 3 to 5 monomer units. Such an anion is usually referred to as a dopant and is known to substantially affect the conductivity of the conductive polymer.

The present invention is based on a discovery that by using at least one member selected from the group consisting of phosphoric acid and its salts, phosphoric acid monoesters and their salts, phosphoric acid diesters and their salts as at least a part of the dopant for the conductive polymer compound, it is possible to impart high electrical conductivity to the conductive polymer, to impart substantial mending capability to the dielectric oxide layer and to minimize the leakage current of the capacitor. So long as the above-mentioned dopant is incorporated in the polymer, other dopants such as aryl sulfonic acid-type dopants may also be present in the polymer.

The phosphoric acid ester to be used in the present invention, may be a phosphoric acid alkyl ester such as phosphoric acid mono-n-butyl ester, phosphoric acid di-n-butyl ester, phosphoric acid monoethyl ester, phosphoric acid diethyl ester or phosphoric acid monododecyl ester, or its salt, or a phosphoric acid aryl ester such as phenyl phosphoric acid, diphenyl phosphoric acid or α-naphthyl phosphoric acid, or its salt, or phytic acid or its salt. In the above-mentioned phosphoric acid esters or their salts, the alkyl group or the aryl group may contain halogen or other functional groups.

The conductive polymer compound may be prepared usually by electrolytic polymerization or chemical polymerization. In the electrolytic polymerization, a monomer of the polymer compound represented by the above-mentioned formula A is dissolved in a solution of the above-mentioned phosphoric acid, phosphoric acid ester or salt thereof. In this solution, a cathode foil and an anode foil are immersed, and an electric current is applied between the anode and the cathode, whereby a conductive polymer compound doped with an anion such as phosphoric acid, a phosphoric acid ester or a salt thereof is formed on the anode. In the chemical polymerization, such a monomer is polymerized in a liquid phase or in a gas phase in the presence of e.g. an oxidizing agent and the above-mentioned anion, to form a conductive polymer compound. There is no particular restriction as to the oxidizing agent to be used in the chemical polymerization. However, compounds having an oxidation-reduction potential higher than the oxidation potential of the monomer, such as a persulfate, hydrogen peroxide, a trivalent iron ion-containing salt such as ferric chloride, a tetravalent cerium salt, and quinones such as benzoquinone, may be used alone or in combination as a mixture of two or more different types.

From a further study, the present inventors have found that when a certain specific compound is incorporated to such a conductive polymer compound, the soldering heat resistance can further be improved, and consequently, the leakage current of the capacitor can effectively be suppressed.

Such a specific compound is a flexible soft polymer compound. Specifically, polyurethane, polyethylene glycol and polyvinyl alcohol may be mentioned, and they may be used alone or in combination as a mixture of two or more different types, as the case requires. The flexibility may be represented by the Young's modulus of the polymer. The Young's modulus is preferably within a range of from $10^2$ to $10^{-2}$ kg/mm², more preferably from 20 to $10^{-1}$ kg/mm².

Such a flexible polymer compound is blended into the conductive compound doped with the phosphoric acid and phosphoric acid ester components.

The flexible polymer compound is used usually in an amount of form 0.1 to 50% by weight, preferably from 0.3 to 30% by weight.

From a further study, the present inventors have found that when the flexible polymer compound is present on the surface of the conductive compound doped with the phosphoric acid component, the soldering heat resistance can further be improved. In such a case, the conductive polymer compound doped with the phosphoric acid component may have the flexible polymer compound blended therein.

From a still further study, the present inventors have found that when the flexible polymer compound is used, it is sometimes possible to improve the soldering heat resistance with a conductive polymer compound doped with a dopant other than the phosphoric acid component.

Namely, a flexible polymer compound is present at at least the surface of the conductive polymer compound doped with a dopant other than the phosphoric acid component.

In such a case, the flexible polymer compound may be present solely at the surface of the conductive polymer compound, or it may be mixed with the conductive polymer compound and further, a layer composed solely of the flexible polymer compound is present thereon. As between the two cases, the soldering heat resistance is higher in the latter than in the former. As the dopant other than the phosphoric acid component used in the present invention, a sulfonic acid type such as an allyl sulfonate or other known anion type dopants may be mentioned.

In any case, a suitable method may be employed for blending the doped conductive polymer compound and the flexible polymer compound. However, the following chemical polymerization or electrolytic polymerization is preferred.

In the chemical polymerization, a monomer of the polymer compound represented by the above formula A is polymerized in a liquid phase in the presence of an oxidizing agent, the dopant anion and the flexible polymer compound.

As the oxidizing agent to be used in the chemical polymerization, compounds having an oxidation-reduction potential higher than the oxidation potential of the monomer, such as a persulfate, hydrogen peroxide, a trivalent iron ion-containing salt such as ferric chloride, a tetravalent cerium salt and a quinone such as benzoquinone, may be used alone or in combination as a mixture of two or more different types.

In the electrolytic polymerization, a monomer of the polymer compound represented by the above-mentioned formula A is dissolved in a solution containing the dopant anion and the flexible polymer compound. Then, electricity is passed between an anode foil and a cathode foil in this solution, whereby a conductive polymer compound containing the flexible polymer compound is formed on the anode foil.

Otherwise, the following method is preferably employed to provide a layer of the flexible polymer compound on the surface of the conductive polymer compound.

For example, by using a cylindrical element, the conductive polymer compound is formed on the dielectric oxide layer by the above-mentioned chemical polymerization or electrolytic polymerization. Then, the conductive polymer compound surface is dipped in a solution in which the flexible polymer compound is dissolved or dispersed in water or in a solvent such as dimethylformamide or acetonitrile, followed by drying.

Further, the impedance of the capacitor can be reduced by mixing fine conducting particles of e.g. active carbon, graphite, manganese dioxide or metal, to the flexible polymer compound.

Now, the present invention will be described in further detail with reference to Examples and Comparative Examples. However, it should be understood that the present invention is by no means restricted by such specific Examples.

EXAMPLE 1

An electrolytic capacitor element (hereinafter referred to simply as a cylindrical capacitor element, rated capacity: 5 $\mu$F, rated voltage: 25 V) which has an anodized aluminum foil anode, which also bears an aluminum foil cathode, wound with interleaved spacer material was immersed in a solution comprising 50 parts by weight of pyrrole and 50 part by weight of ethanol and kept to stand therein for 5 minutes. Then, the capacitor element was taken out from the solution and immersed in an aqueous solution containing 20% by weight of ammonium persulfate and 5% by weight of phenyl phosphoric acid and kept at 0° C. for 30 minutes, to polymerize pyrrole on the surface of the capacitor element. After completion of the reaction, an unreacted oxidizing agent and excess acid were removed by washing with water, and the element was vacuum-dried at 100° C. for one hour. The capacitor element thus obtained was put in an aluminum casing, which was then sealed to obtain a solid electrolytic capacitor. The electric conductivity of the formed polymer was 12 S/cm. The properties of the capacitor obtained are shown in Table 1.

EXAMPLE 2

The same capacitor element as used in Example 1 was immersed in a pyrrole monomer solution for 5 minutes. Then, the capacitor element was taken out from the solution and immersed in an aqueous solution containing 10% by weight of ammonium persulfate and 2% by weight of $\alpha$-naphthyl phosphoric acid kept at 5° C. for 30 minutes to polymerize pyrrole on the surface of the capacitor element. The element thus obtained was treated in the same manner as in Example 1 to obtain a solid electrolytic capacitor. The electric conductivity of the polymer was 15 S/cm. The properties of the capacitor thus obtained are shown in Table 1.

EXAMPLE 3

The same capacitor element as used in Example 1 was immersed in a pyrrole monomer solution for 5 minutes. Then, this capacitor element was taken out from the solution and immersed in an aqueous solution containing 10% by weight of ammonium persulfate, 2% by weight of $\alpha$-naphthalene sulfonic acid and 1% by weight of mono-n-dodecyl phosphoric acid kept at 5° C. for 30 minutes to polymerize pyrrole on the surface of the capacitor element. The element thus obtained was treated in the same manner as in Example 1 to obtain a solid electrolytic capacitor. The electric conductivity of the polymer was 25 S/cm. The properties of the capacitor thus obtained are shown in Table 1.

EXAMPLE 4

The same capacitor element as used in Example 1 was immersed in an aqueous soution containing 0.1 N/liter of pyrrole and 0.1 N/liter of phosphoric acid, and a square wave pulse current (current density: 5 mA/cm$^2$ as calculated based on the surface area of the anode foil, duty factor: 50%) was applied between an anode and a cathode of the element for 30 minutes to electrolytically polymerize pyrrole. The element thus obtained was treated in the same manner as in Example 1 to obtain a solid electrolytic capacitor. The electric conductivity of the polymer was 5 S/cm. The properties of the capacitor thus obtained are shown in Table 1.

EXAMPLE 5

The same capacitor element as used in Example 1 was immersed in a pyrrole monomer solution for 5 minutes. Then, this capacitor element was taken out from the solution and immersed in an aqueous solution containing 5% by weight of ammonium persulfate and 5% by weight of phytic acid kept at 5° C. for 30 minutes, to polymerize pyrrole on the surface of the capacitor element. The element thus obtained was treated in the same manner as in Example 1 to obtain a solid electrolytic capacitor. The electric conductivity of the polymer was 8 S/cm. The properties of the capacitor thus obtained are shown in Table 1.

EXAMPLE 6

By using the same capacitor element as used in Example 1, thiophene was polymerized in the capacitor element under the same conditions as in Example 4 in a solution comprising 0.1 N/liter of thiophene and 0.2 N/liter of phosphoric acid. The element thus obtained was treated in the same manner as in Example 1 to obtain a solid electrolytic capacitor. The electric conductivity of the polymer was 11 S/cm. The properties of the capacitor thus obtained are shown in Table 1.

COMPARATIVE EXAMPLE 1

Among the TCNQ complex salts disclosed in Japanese Unexamined Patent Publication No. 191414/1983, an N-n-butyl isoquinolinium (TCNQ)$_2$ complex salt having the minimum specific resistance (3.4 cm) was used. This complex salt was filled in aluminum can casing and melted on a hot plate kept at 260° C. Then, a cylindrical aluminum electrolytic capacitor element (rated capacity: 5 μF, rated voltage: 25 V) preliminarily heated to the same temperature, was quickly put in the aluminum can casing to impregnate the TCNQ complex salt and maintained for 10 seconds. Then, the capacitor element was withdrawn together with the casing and left to naturally cool. Then, the opening of the casing was sealed with an epoxy resin to prepare a solid electrolytic capacitor. To this solid electrolytic capacitor, the rated voltage was applied at 125° C. for one hour for aging, whereupon the properties were measures. The results are shown in Table 1.

TABLE 1

|  | Static capacity (μF, 120 Hz) | tan δ (120 Hz) | Equivalent series resistance (Ω, 100 kHz) | Leakage current (μA, after 1 min.) |
| --- | --- | --- | --- | --- |
| Example 1 | 5.2 | 0.013 | 0.21 | 0.004 |
| Example 2 | 5.1 | 0.015 | 0.28 | 0.003 |
| Example 3 | 5.0 | 0.012 | 0.18 | 0.005 |
| Example 4 | 5.2 | 0.018 | 0.35 | 0.002 |
| Example 5 | 5.1 | 0.016 | 0.22 | 0.002 |
| Example 6 | 5.0 | 0.014 | 0.21 | 0.003 |
| Comparative Example 1 | 3.2 | 0.080 | 0.65 | 0.09 |

From the above results, it is evident that the capacitors of the present invention provide the following effects as compared with the conventional solid electrolytic capacitors.

(1) The adhesion of the conductive polymer compound to the dielectric oxide layer is excellent, whereby the rated capacity can be certainly obtained.

(2) It is unnecessary to heat the capacitor element to a high temperature, whereby a danger of damaging the dielectric oxide layer is eliminated. Further, the mending capability of the conductive polymer compound against the dielectric oxide layer is excellent, whereby the leakage current can substantially be reduced.

(3) The electric conductivity of the solid electrolyte is higher than the TCNQ complex salt, and tan δ and the equivalent series resistance are low, whereby high frequency characteristics are good.

(4) The production cost is low.

EXAMPLE 7

A cylindrical aluminum electrolytic capacitor element (rated capacity: 5 μF, rated voltage: 25 V) was immersed in a pyrrole monomer solution and left to stand for 5 minutes. Then, the capacitor element was taken out from the monomer solution and immersed in an aqueous solution comprising 10% by weight of ammonium persulfate, 5% by weight of β-naphthalene sulfonic acid, 5% by weight of α-naphthyl phosphoric acid and 5% by weight of polyethylene glycol (molecular weight: 8,500) and kept at 0° C. for 30 minutes for polymerization, whereby a composite layer of polypyrrole and polyethylene glycol doped with β-naphthalene sulfonic acid ions and α-naphthyl phosphoric acid ions was formed on the dielectric oxide layer. After completion of the reaction, an unreacted substance and reaction products other than the above polypyrrole-polyethylene glycol were removed by washing with water. Then, the element was immersed in an aqueous solution containing 20% by weight of polyethylene glycol (molecular weight: 8,500), followed by drying under vacuum at 100° C. to obtain a capacitor having a polyethylene glycol layer formed on the polypyrrole-polyethylene glycol composite layer. The Young's modulus of this polyethylene glycol was 12 kg/mm². Then, this capacitor was put into an aluminum casing, and the opening of the casing was sealed with resin, and the entire casing was molded with an epoxy resin to obtain a chip-form solid electrolytic capacitor. To this capacitor, the rated voltage was applied for one hour at 25° C. for aging and then subjected to a soldering heat resistance test by dipping it in a soldering bath molten at 260° C., for 10 seconds and then leaving it to cool. The characteristics before and after the test are shown in Table 2.

EXAMPLE 8

In the same manner as in Example 7, a composite layer of doped polypyrrole and polyethylene glycol was formed by polymerization on the dielectric oxide layer of a capacitor element. Then, this element was immersed in an aqueous solution having 10% by volume of polyethylene glycol (average molecular weight: 8,500) dissolved and 8% by weight of commercially available aqueous graphite (Aquadaq, tradename, manufactured by Japan Acheson Co.) dispersed therein. Then, it was dried under vacuum at 100° C. to obtain a capacitor having a polyethylene layer containing fine particles of graphite formed on the doped polypyrrole-polyethylene glycol composite layer. This capacitor was formed into a chip and subjected to a soldering heat resistance test in the same manner as in Example 7. The results are shown in Table 2.

The Young's modulus of this polyethylene glycol/aqueous graphite composite layer was 20 kg/mm².

EXAMPLE 9

The same capacitor element as used in Example 7 was immersed in a pyrrole monomer solution for 5 minutes.

Then, this capacitor element was taken out from the monomer solution and immersed in an aqueous solution comprising 5% by weight of toluene sulfonic acid, 5% by weight of ammonium persulfate and 1% by weight of polyvinyl alcohol (polymerization degree: 300) and kept at 0° C. for 1 hour for polymerization, whereby a composite layer of polypyrrole and polyvinyl alcohol doped with toluene sulfonic acid ions was formed on the dielectric oxide layer. After completion of the reaction, an unreacted substance and reaction products other than the polyvinyl alcohol/doped polypyrrole were removed by washing with water.

Then, this element was immersed in a dispersion containing 20% by weight of polyurethane (modulus of elasticity after drying: 0.3 kg/mm²) prepared by reacting polypropylene ether glycol, toluene diisocyanate and diethylene triamine, as disclosed in the Examples of Japanese Examined Patent Publication No. 3677/1977. Then, the element was dried under vacuum at 100° C. to obtain a capacitor having a polyurethane layer formed on the polyvinyl alcohol/doped polypyrrole composite layer. This capacitor was formed into a chip and subjected to a soldering heat resistance test in the same manner as in Example 7. The results are shown in Table 2.

EXAMPLE 10

A chip-form capacitor was prepared and tested for the soldering heat resistance in the same manner as in Example 9 except that instead of the polyurethane dispersion in Example 9, a dispersion having 40% by weight of commercially available fine nickel particles (average particle size: 5 μm, manufactured by Nikko Fine Products K.K.) dispersed in the above-mentioned dispersion, was used. The results are shown in Table 2.

The modulus of elasticity of this polyurethane/Ni powder composite layer was 1.8 kg/mm².

EXAMPLE 11

The same capacitor element as used in Example 7 was immersed in a pyrrole monomer solution for 5 minutes Then this capacitor element was immersed in an aqueous solution comprising 5% by weight of phenyl phosphoric acid and 5% by weight of ammonium persulfate and kept at 0° C. for 30 minutes, to form a polypyrrole layer doped with phenyl phosphoric acid ions on the dielectric oxide layer. After completion of the reaction, the element was washed with water and dried, and then treated with a polyurethane dispersion in the same manner as in Example 9 to obtain a capacitor having a polyurethane layer formed on the doped polypyrrole layer. This capacitor was formed into a chip and subjected to a soldering heat resistant test in the same manner as in Example 7. The results are shown in Table 2.

EXAMPLE 12

The same capacitor element as used in Example 7 was dipped in a pyrrole monomer solution for 10 minutes. Then, this capacitor element was immersed in an aqueous solution comprising 5% by weight of β-naphthalene sulfonic acid and 10% by weight of ammonium persulfate and kept at 5° C. for one hour, to form a polypyrrole layer doped with β-naphthalene sulfonic acid ions on the dielectric oxide layer. After completion of the reaction, the element was washed with water and dried, and then immersed in an aqueous solution containing 10% by weight of polyethylene glycol (molecular wight: 50,000, Young's modulus: 18 kg/mm²) and dried to form a polyethylthe glycol layer on the doped polypyrrole layer. Then, it was formed into a chip and subjected to a soldering heat resistance test in the same manner as in Example 7. The results are shown in Table 2.

EXAMPLE 13

The same capacitor element as used in Example 7 was immersed in a pyrrole monomer solution for 5 minutes. Then, it was taken out from the monomer solution and immersed in an aqueous solution comprising 5% by weight of phenyl phosphoric acid, 5% by weight of polyethylene glycol (average molecular weight: 50,000) and 5% by weight of ammonium persulfate and kept at 0° C. for 1 hour, to form a polypyrrole/polyethylene glycol composite layer doped with phenyl phosphoric acid ions on the dielectric oxide layer. Then, the capacitor was formed into a chip and subjected to a soldering heat resistance test in the same manner as in Example 7. The results are shown in Table 2.

COMPARATIVE EXAMPLE 2

The same capacitor element as used in Example 7 was immersed in a pyrrole monomer solution for 10 minutes. Then, this element was immersed in an aqueous solution comprising 5% by weight of toluene sulfonic acid, 5% by weight of ammonium persulfate and 1% by weight of polyvinyl alcohol (polymerization degree: 300) and kept at 0° C. to form a polypyrrole/polyvinyl alcohol composite layer doped with toluene sulfonic acid ions on the dielectric oxide layer. The element was washed with water and dried. Then, the capacitor was formed into a chip and subjected to a soldering heat resistance test in the same manner as in Example 7. The results are shown in Table 2.

COMPARATIVE EXAMPLE 3

The same element as used in Example 7 was immersed in an aqueous solution prepared by dissolving 25 g of ferric chloride ($FeCl_3$) and 1.6 g of polyvinyl alcohol in 100 g of water. Then, while being wet with this solution, the element was put in a closed container in which a container containing a pyrrole monomer solution is placed, whereupon the reaction was conducted in a pyrrole vapor phase at room temperature under a normal pressure to form a polypyrrole/polyvinyl alcohol composite layer on the dielectric oxide layer. Then, the element was washed with water and dried, and then formed into a chip and subjected to a soldering heat resistance test in the same manner as in Example 7. The results are shown in Table 2.

TABLE 2

| | Static capacity (μF, 120 Hz) | tan δ (120 Hz) | Equivalent series resistance (Ω, 100 kHz) | Leakage current (μA, after 1 min.) | Soldering heat resistance (260° C. for 10 sec.) Leakage current (μA, after 1 min.) |
|---|---|---|---|---|---|
| Ex. 7 | 5.0 | 0.010 | 0.15 | 0.003 | 0.003 |
| Ex. 8 | 5.1 | 0.008 | 0.08 | 0.003 | 0.003 |
| Ex. 9 | 5.0 | 0.012 | 0.12 | 0.50 | 0.51 |
| Ex. 10 | 5.1 | 0.007 | 0.06 | 0.51 | 0.51 |
| Ex. 11 | 5.1 | 0.013 | 0.20 | 0.004 | 0.004 |
| Ex. 12 | 5.0 | 0.015 | 0.18 | 0.45 | 0.46 |
| Ex. 13 | 5.0 | 0.013 | 0.21 | 0.004 | 0.81 |
| Comp. Ex. 2 | 5.1 | 0.018 | 0.16 | 0.60 | 102.5 |
| Comp Ex. 3 | 5.0 | 0.020 | 0.25 | 0.65 | 213.8 |

Rated value of leakage current: 0.01 CV = 1.25 μA.

From the above results, it is evident that the leakage current of the capacitors having a flexible polymer formed on a polypyrrole layer or on a polypyrrole/polymer composite layer in Examples 7 to 12, does not substantially change as between before and after the soldering heat resistance test, and excellent soldering heat resistance can be imparted. Further, in Examples 7, 8, 11 and 13, a dopant such as phosphoric acid is used, whereby the leakage current is substantially lower than the polypyrrole system where an aryl sulfonic acid or the like is used as the dopant.

In Example 13, the leakage current increased about 200 times after the soldering heat resistance test. However, by the use of a phosphoric acid type dopant, the initial leakage current is very low, and the current leakage is well below the rated value of leakage current i.e. 0.01 CV=1.25 μA, whereby there is no problem.

On the other hand, in Comparative Examples 2 and 3, the leakage current after the soldering heat resistance test exceeded more than ten times than the rated value, thus indicating poor soldering heat resistance.

What is claimed is:
1. A solid electrolytic capacitor comprising a dielectric oxide layer and a solid electrolyte layer of a conductive polymer compound formed thereon, wherein said conductive polymer compound is a conductive polymer compound doped with at least one member selected from the group consisting of phosphoric acid, phosphoric acid monoesters, phosphoric acid diesters and salts thereof.

2. The solid electrolytic capacitor according to claim 1, wherein the matrix polymer constituting said conductive polymer compound is a polymer having repeating units represented by the formula:

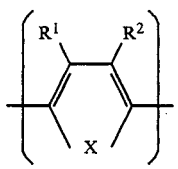
(A)

wherein each of $R^1$ and $R^2$ is hydrogen, halogen, an alkyl group, an aryl group, an alkylaryl group, or $R^1$ and $R^2$ together form a ring structure, and x is —O—, —S—,

(wherein $R^3$ is hydrogen, an alkyl group, an aryl group or an alkylaryl group).

3. A solid electrolytic capacitor comprising a dielectric oxide layer and a solid electrolyte layer of a conductive polymer compound formed thereon, wherein a flexible polymer compound layer is formed on at least the surface of said conductive polymer compound.

4. The solid electrolytic capacitor according to claim 3, wherein said conductive polymer compound is a conductive polymer compound doped with at least one member selected from the group consisting of phosphoric acid, phosphoric acid monoesters, phosphoric acid diesters and salts thereof.

5. The solid electrolytic capacitor according to claim 4, wherein the matrix polymer constituting said conductive polymer compound is a polymer having repeating units represented by the formula:

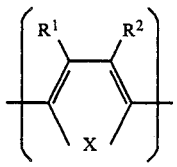
(A)

wherein each of $R^1$ and $R^2$ is hydrogen, halogen, an alkyl group, aryl group, an alkylaryl group, or $R^1$ and $R^2$ together form a ring structure, and X is —O—, —S—,

(wherein $R^3$ is hydrogen, an alkyl group, and aryl group or an alkylaryl group).

6. The solid electrolytic capacitor according to claim 3, wherein the matrix polymer constituting said conductive polymer compound is a polymer having repeating units represented by the formula:

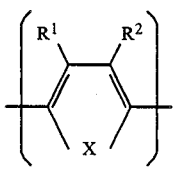
(A)

wherein each of $R^1$ and $R^2$ is hydrogne, halogen, an alkyl group, an aryl group, an alkylaryl group, or $R^1$ and $R^2$ together form a ring structure, and X is —O—, —S—,

(wherein $R^3$ is hydrogen, an alkyl group, an aryl group or an alkylaryl group).

7. The solid electrolytic capacitor according to claim 3, wherein the flexible polymer compound is at least one compound selected from the group consisting of polyurethane, polyethylene glycol and polyvinyl alcohol.

8. A solid electrolytic capacitor comprising a dielectric oxide layer and a solid electrolyte layer of a conductive polymer compound formed thereon, wherein said conductive polymer compound is a conductive polymer compound doped with at least one member selected from the group consisting of phosphoric acid, phosphoric acid monoesters, phosphoric acid diesters and salts thereof and having a flexible polymer compound blended therein.

9. The solid electrolytic capacitor according to claim 8, wherein the flexible polymer compound is at least one compound selected from the group consisting of polyurethane, polyethylene glycol and polyvinyl alcohol.

* * * * *